United States Patent
Yamamoto et al.

(10) Patent No.: US 12,481,853 B2
(45) Date of Patent: Nov. 25, 2025

(54) IMAGE PROCESSING DEVICE AND IMAGE PROCESSING PROGRAM

(71) Applicant: SEIKO EPSON CORPORATION, Tokyo (JP)

(72) Inventors: Yuko Yamamoto, Nagano (JP); Takahiro Kamada, Nagano (JP); Mitsuhiro Yamashita, Nagano (JP); Takuya Ono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 18/527,449

(22) Filed: Dec. 4, 2023

(65) Prior Publication Data

US 2024/0185014 A1   Jun. 6, 2024

(30) Foreign Application Priority Data

Dec. 6, 2022  (JP) ................. 2022-194704

(51) Int. Cl.
*G06K 15/02* (2006.01)
*G06K 15/10* (2006.01)

(52) U.S. Cl.
CPC ....... *G06K 15/1878* (2013.01); *G06K 15/027* (2013.01); *G06K 15/102* (2013.01)

(58) Field of Classification Search
CPC ............. G06K 15/1878; G06K 15/027; G06K 15/102; H04N 1/603; H04N 1/54; H04N 1/6016
See application file for complete search history.

(56) References Cited

U.S. PATENT DOCUMENTS

| | | | | |
|---|---|---|---|---|
| 2007/0296988 | A1* | 12/2007 | Tsuji | H04N 1/6052 358/1.9 |
| 2008/0266316 | A1* | 10/2008 | Takahashi | G09G 5/02 345/590 |
| 2009/0052771 | A1* | 2/2009 | Ohga | H04N 1/603 382/165 |
| 2009/0284812 | A1 | 11/2009 | Tsukamoto | |
| 2019/0187489 | A1* | 6/2019 | Valentine | G02C 7/104 |
| 2021/0397387 | A1* | 12/2021 | Nakashio | G06F 3/1285 |

FOREIGN PATENT DOCUMENTS

JP  2009-278362 A  11/2009
JP  2020-205539 A  12/2020

* cited by examiner

*Primary Examiner* — Iriana Cruz
(74) *Attorney, Agent, or Firm* — Global IP Counselors, LLP

(57) ABSTRACT

A print image is acquired as first image data represented in a first color space used for forming an image on a first print medium. Second image data is acquired by performing, on the first image data, conversion into representation in a profile connection space using a first conversion table and white point conversion using the information on appearance in a redetermined observation environment, of a base color section where an image is not formed on the first print medium. The second image data is converted by using a second conversion table into converted image data represented in a second color space used for forming an image on a second print medium and an image corresponding to the print image is formed on the second print medium by using the converted image data.

9 Claims, 12 Drawing Sheets

IMAGE PROCESSING DEVICE AND IMAGE PROCESSING PROGRAM

The present application is based on, and claims priority from JP Application Serial Number 2022-194704, filed Dec. 6, 2022, the disclosure of which is hereby incorporated by reference herein in its entirety.

BACKGROUND

1. Technical Field

The present disclosure relates to an image processing technique for reproducing an image to be printed on a predetermined print medium, on another print medium.

2. Related Art

There is a demand for confirming the appearance of an image on a print medium on which the image is actually to be reproduced (hereinafter, referred to as "reproduction print medium") by forming the image on a medium that is different from the reproduction print medium (hereinafter, referred to as "indication print medium"), and various kinds of image processing for that purpose have been proposed. Complicated labor is required for reproducing the appearance of an image as it will appear on a reproduction print medium on a indication print medium since there are many kinds of reproduction print media including, in addition to ordinary printing paper, those of different materials such as paper coated or impregnated with a fluorescent whitening agent, a synthetic resin film, and cloth, and further there are those having a base color other than white and those having some type of coloring. The appearance varies depending on the observation environment, in particular, the light emission characteristics including the white balance of the light source.

Therefore, for example, in JP-2009-278362, the appearance of the image on the reproduction print medium is shown on the indication print medium as follows. First, a spectral characteristic of a color patch formed on a medium corresponding to the reproduction print medium is measured, and it is determined whether or not the medium contains a fluorescent whitening agent based on the measured values. The measurement value of the color patch is corrected according to the determined result, and a color profile is created based on the corrected measurement values of the color patch and the measurement values of the observation environment at the time when the color patch is formed. Using the color profile thus obtained, the appearance of the image on the reproduction print medium is shown on the indication print medium.

However, in the above-described method, when it is determined that a fluorescent whitening agent is contained, it is necessary e a color profile for each observation environment, which is troublesome. Furthermore, it is necessary to correctly select and operate the created profile with respect to the observation environment for which the profile is to be created, and time and effort are required for management and operation.

SUMMARY

The present disclosure can be implemented as the following aspects or application examples. A first aspect of the present disclosure is an image processing device. The image processing device includes an image data acquisition section configured to acquire a print image as first image data represented in a first color space used for forming an image on a first print medium; an input section configured to input information on appearance, in a predetermined observation environment, of a base color section where an image is not formed on the first print medium; a first conversion section configured to acquire second image data by performing, on the first image data, conversion into a representation in a profile connection space using a first conversion table and white point conversion using the information on appearance; a second conversion section configured to use a second conversion table to convert the second image data into converted image data that is represented in a second color space used for forming an image on a second print medium; and an image forming section configured to use the converted image data to form an image corresponding to the print image on the second print medium.

A second aspect of the present disclosure is an image processing program. This image processing program is realized by a computer executing a first function of acquiring a print image as first image data represented in a first color space used for forming an image on a first print medium; a second function of inputting information on appearance, in a predetermined observation environment, of a base color section where an image is not formed on the first print medium; a third function of acquiring second image data by performing, on the first image data, conversion into a representation in a profile connection space using a first conversion table and white point conversion using the information on appearance; a fourth function of using a second conversion table to convert the second image data into converted image data that is represented in a second color space used for forming an image on a second print medium; and a fifth function of forming an image corresponding to the print image on the second print medium using the converted image data.

DESCRIPTION OF EMBODIMENTS

A. First Embodiment (A1) Hardware Configuration

Figure 1:
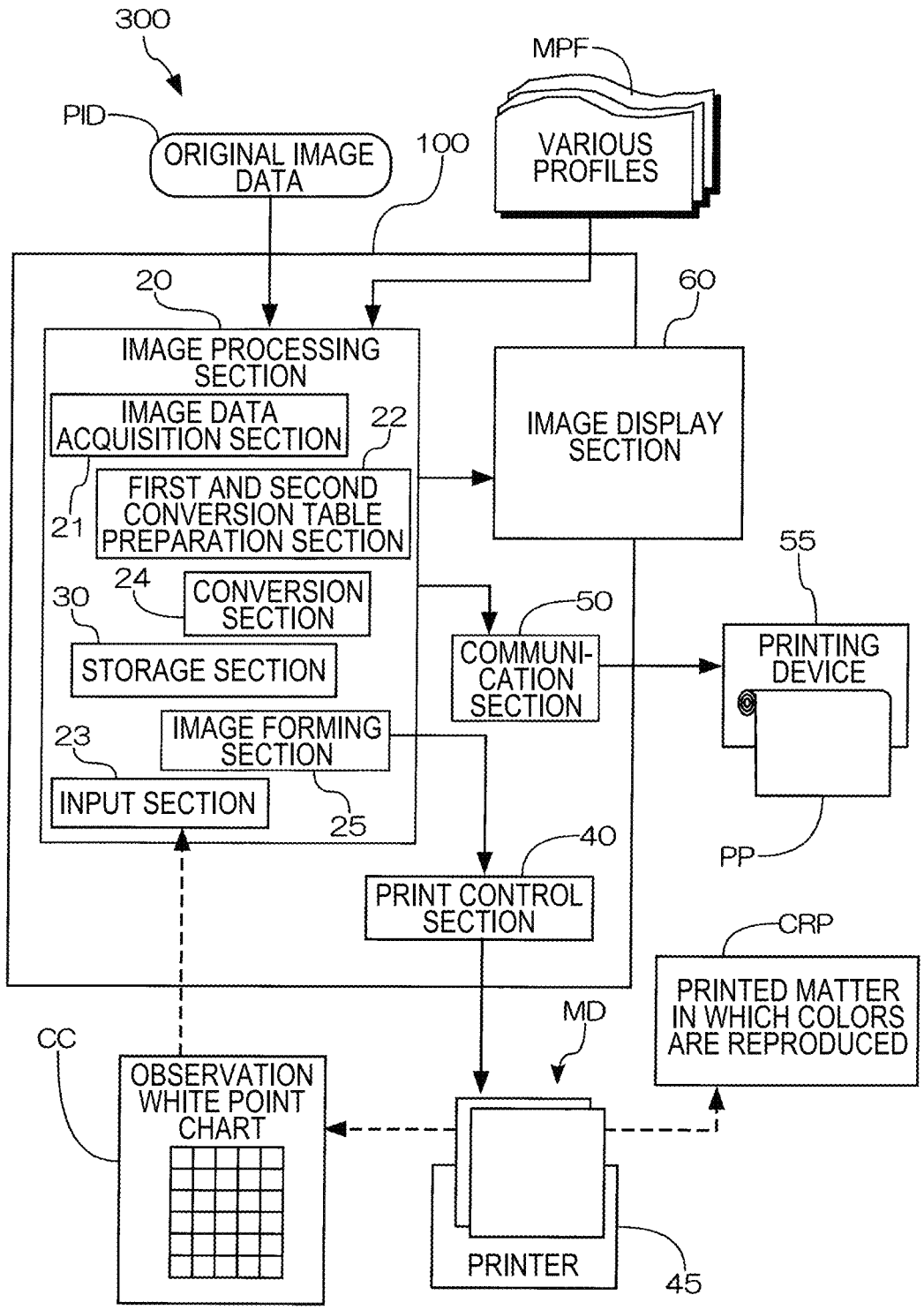
FIG. 1 is a schematic configuration diagram illustrating a printing system including an image processing device according to an embodiment.

FIG. 1 shows a schematic configuration of an image processing device 100 according to a first embodiment and a printing system 300 using the image processing device 100. As illustrated, the printing system 300 includes the image processing device 100, which processes original image data PID of an original image to be printed, a printing device 55, which prints an image on a desired print medium PP corresponding to a first print medium, and a printer 45, which performs printing on a second print medium (hereinafter, referred to as a medium for distinction) MD different from the print medium PP. The printer 45 reproduces, on the medium MD, the color of the original image, which is to be reproduced on the print medium PP using the printing device 55.

The image processing device 100 includes an image processing section 20, which includes a storage section 30 that stores various data such as image data, calculation results, and the like, a print control section 40 that controls the printer 45 such as outputting print data to the printer 45, a communication section 50 that communicates with the printing device 55, an image display section 60 that displays an image for a UI, and the like. The image processing section 20 includes an image data acquisition section 21 that acquires first image data from the original image data PID, a conversion table preparation section 22 that prepares a first conversion table and a second conversion table, an input section 23 by which data and the like is input from an external source, a conversion section 24 that performs conversion processes including white point conversion (to be described later), and an image forming section 25 that performs image forming processes including printing on the medium MD. Although the operation of each section will be described in detail later, the function of each section is realized by a CPU included in the image processing section 20 executing a program stored in the storage section 30.

The image processing section 20 inputs the original image data PID and the various profiles MPF, performs image processing, and prints an image on the print medium PP using the printing device 55. The image processing section 20 also performs image processing for confirming how the original image will be reproduced by the printing device 55 before actually performing printing on the print medium PP. Specifically, the appearance of the image reproduced on the print medium PP, in particular, how the color is reproduced, is confirmed by printing on the medium MD using the printer 45. The print medium PP corresponds to a reproduction print medium on which an image is to be actually reproduced, and the medium MD corresponds to an indication print medium on which color reproduction is confirmed using a medium different from the print medium PP, which is the reproduction print medium. It should be noted that in the present embodiment, the printing device 55 is a textile printing machine that performs printing on a fabric. Since the print medium PP on which the printing device 55 performs textile printing is a fabric, the base color is different from so-called white and may be colored. A fluorescent whitening agent or the like may be applied to or impregnated in the fabric, and the recognized white color may be different depending on the presence or absence, or the amount of, fluorescent whitening agent and depending on the presence or absence of ultraviolet light.

On the other hand, the printer 45 is an ink jet printer that performs printing with CMYK inks on normal plain paper or on photographic paper as the medium MD. The printer 45 receives control from the printing control section 40, which received instructions from the image processing section 20 of the image processing device 100, and prints an observation white point chart CC, which is a color chart for observing the white point on the medium MD, prints printed matter CRP, in which the color of the image formed on the print medium PP by the printing device 55 is reproduced, and the like.

The image processing device 100 uses the various profiles MPF in image processing. Such profiles MPF may be stored in advance in the image processing device 100, or may be acquired as necessary from an external site via a network or the like. As a matter of course, a configuration may be adopted in which a profile with a high use frequency is stored in the image processing device 100 in advance, and a profile with a low use frequency is acquired from an external site. Profiles that are used include:

- An input profile for converting an original image represented in a device-dependent color space (for example, RGB or CMYK) into a representation in a device-independent color space (for example, L*a*b* or XYZ color system)·An output profile for converting an image represented in a device-independent color space (for example, L*a*b* or XYZ) into a representation in a device-dependent color space (for example, RGB or CMYK)
- A medium profile, which is an output profile created including characteristics of a print medium in a case of printing, characteristics of an LED panel in a case of display, and the like
- A device link profile that combines an input profile and a medium profile
- A common profile for converting between device-independent color spaces The image display section 60 can be used as a second print medium instead of the printer 45. It is sufficient that in this case, an output profile that performs conversion from the color system of a device-independent profile connection space to the second color space that is the color system of the image display section 60 be used as the second conversion table. By this, it is possible to display the observation white point chart CC on the image display section 60, to display an image in which colors are reproduced instead of on the printed matter CRP in which colors are reproduced, or the like. The image display section 60 may be replaced by an optical display device such as a tablet separate from the image processing device 100.

(A2) Image Processing

An image process performed by the image processing device 100 will be described with reference to FIG. 2. The illustrated image process is for reproducing, on the medium MD using the printer 45, the appearance of the original image data PID as it would be when printed by the printing device 55 on the print medium PP. When the image processing section 20 of the image processing device 100 starts this process in response to an instruction from the user, the image processing section 20 first performs the function of the image data acquisition section 21, that is, the process of acquiring print image data (step S100). Although details of this process will be described later, the process is a process of acquiring first image data, which is data of an image used when actually printing using the printing device 55 based on the original image data PID.

Next, a medium profile for the reproduction print medium is selected (step S210). Here, the medium profile of the reproduction print medium that is used when printing is performed on the print medium PP using the printing device 55 is selected. This medium profile corresponds to a first conversion table. Similarly, a medium profile for the indication print medium is selected (step S220). Here, a printing profile that is used when printing is performed on the medium MD using the printer 45 is selected. Then, an observation white point chart CC, which is a color chart of a predetermined range including a white point, is printed by the printer 45 in accordance with the printing profile of the reproduction target selected in step S210 (step S300), and the observation white point chart CC and the color of a non-printed section (base color section) of the reproduction print medium are compared visually under predetermined illumination, and the color closest to the color of the non-printed section is input (step S230). In addition, a conversion process (step S400) is executed of converting the color of the first image data reproduced on the print medium PP by the printing device 55 into converted image data, which is to be printed by the printer 45. Details of these processes will also be described later. Finally, the converted image data obtained by the conversion is printed on the medium MD by the printer 45 (step S240), and the image process is ended.

Figure 3A:
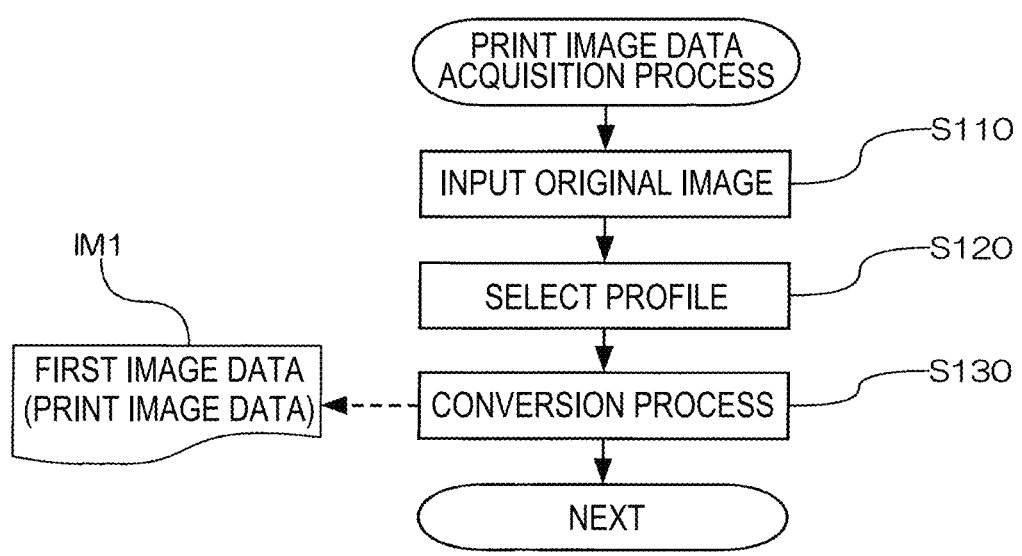
FIG. 3A is a flowchart illustrating an overview of a print image data acquisition process according to an embodiment.
Figure 3B:
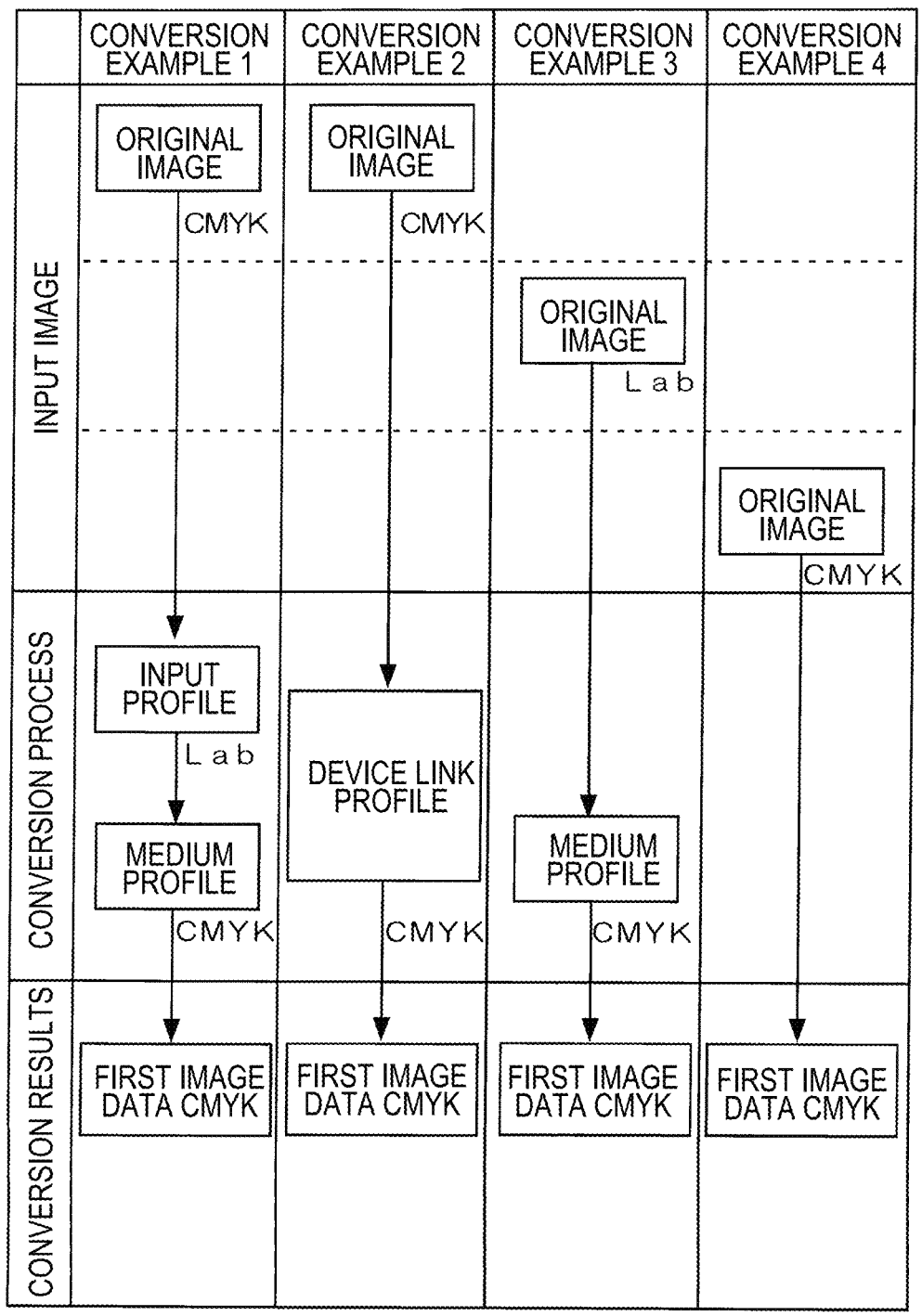
FIG. 3B is an explanatory diagram exemplifying combinations of original image format and profiles in the print image data acquisition process.

Hereinafter, details of each process will be sequentially described. FIG. 3A is a flowchart showing details of the print image data acquisition process of step S100. As shown in the figure, when the print image data acquisition process is started, first, a process of inputting the original image PID is performed (step S110), and then a process of selecting a profile to be applied is performed (step S120). The profile to be selected varies depending on the format of the input original image data PID, that is, depending on the color space in which the image is to be represented. Relationships between formats of the original image data PID and profiles are illustrated in FIG. 3B.

The original image data PID can take various forms, but as shown in the figure, if the original image data PID is not represented by the color space of the printer, it is sufficient that an input profile for converting the original image data PID into color values of a device-independent color space and a medium profile for converting this into color values dependent on a device, here, the printing device 55 for printing on the print medium PP with ink, be used. Specifically, first, the original image data PID is converted into L*a*b* (hereinafter, may be simply abbreviated as Lab), which are device-independent color values, using an input profile for converting the original image data PID into Lab, and then converted using a medium profile for converting Lab into the device-dependent color values (CMYK) in which the printing device 55 forms an image on the print medium PP, and the first image data represented by the color values of CMYK is acquired (conversion example 1). The color values of RGB may be directly converted into CMYK using a device link profile in which the input profile and the medium profile are integrated (conversion example 2).

On the other hand, if the original image data PID is represented by Lab color values, it is sufficient that the original image data PID be directly converted into CMYK using only the medium profile (conversion example 3). Further, if the original image data PID is represented by the color values CMYK when an image is formed on the print medium PP by the printing device 55, it is sufficient that the original image data PID be acquired as the first image data as it is without being converted (conversion example 4).

The color values of the original image data PID in the first and second conversion examples are not limited to CMYK, and may be RGB or other device-dependent color values. The color values of the original image data PID in the third conversion example are not limited to Lab, and may be any format as long as it is a device-independent color value such as XYZ. The first image data is acquired by the conversion process (FIG. 3A, step S130).

Figure 4:
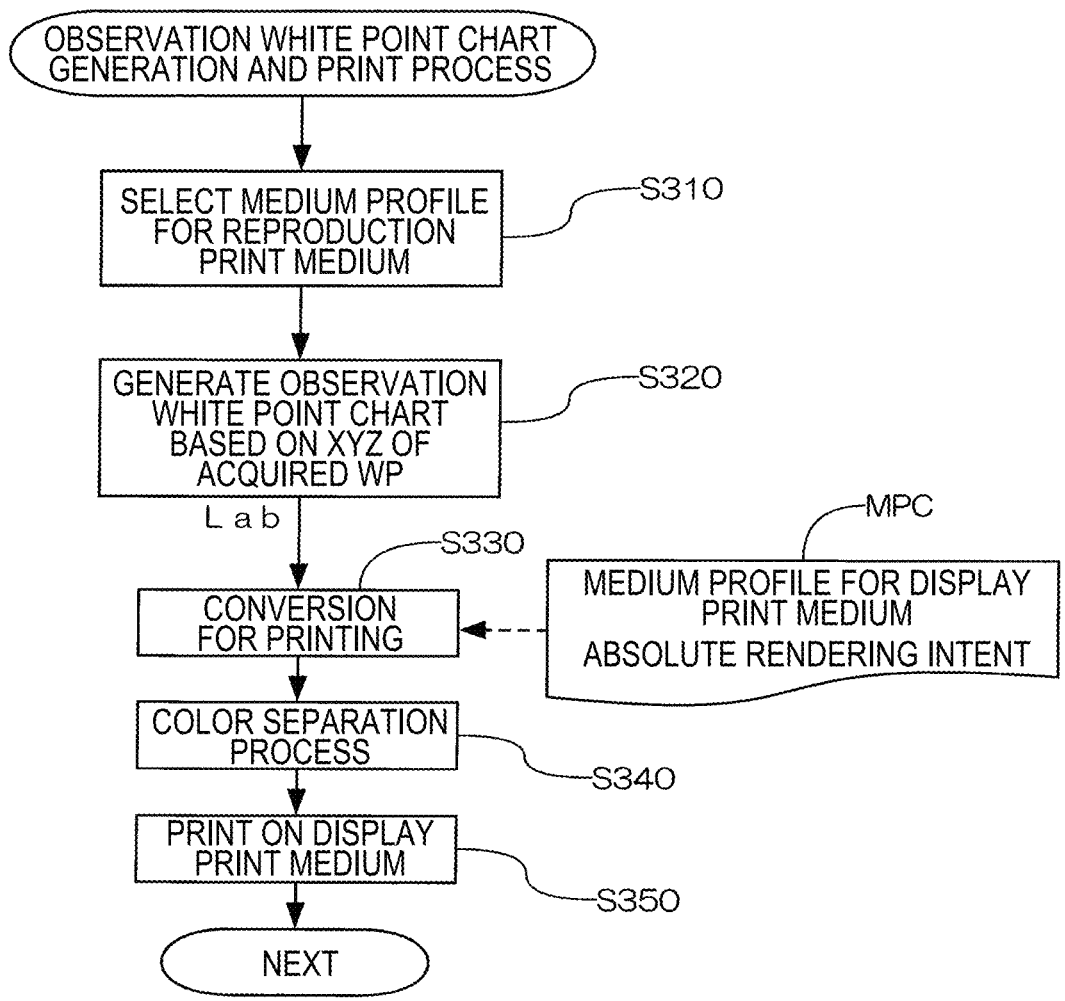
FIG. 4 is a flowchart showing an overview of generation and printing of a color chart including a white point.

Next, a print process (step S300) of an observation white point chart including a white point will be described. FIG. 4 is a flowchart showing the print process of the observation white point chart. When the process is started, first, the white point WP of the medium profile of the reproduction print medium prepared in advance is acquired. The medium profile is the one selected in step 210 in the image processing shown in FIG. 2. The white point is preset in the medium profile. Here, the observation white point chart CC is generated based on the color values of the white point WP. At this time, the color values of the white point are grasped by device-independent color values, for example, XYZ or Lab, and the observation white point chart CC is generated so as to cover a predetermined range including the color values of the white point WP.

Figure 5:
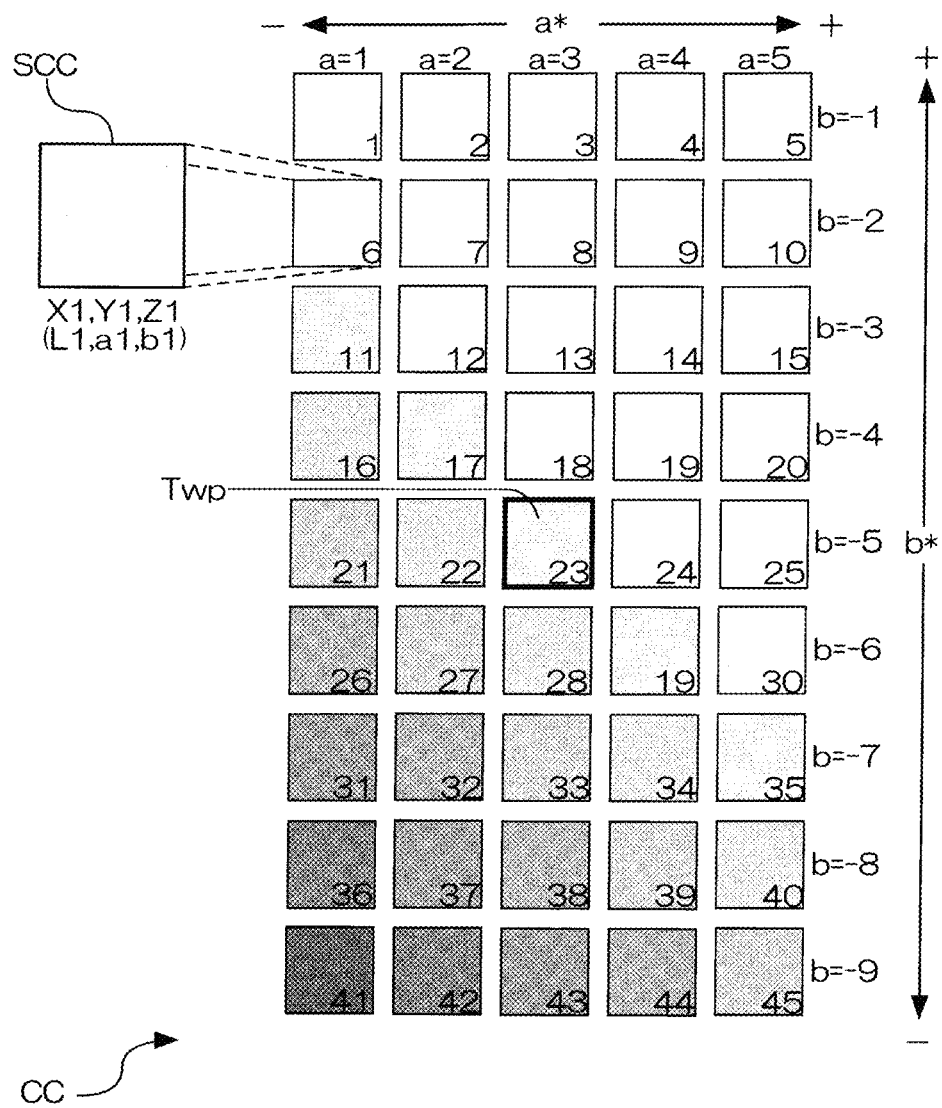
FIG. 5 is an explanatory diagram conceptually showing an example of a color chart.

An example of the observation white point chart CC is shown in FIG. 5. In this example, the observation white point chart CC is generated so as to cover a predetermined range in the Lab color space in the a* direction and in the b* direction, but with the same Y value (L*). In this example, the patch Twp at the center of the observation white point chart CC corresponds to the white point in the medium profile. When a fluorescent whitening agent is included in the print medium PP, which is the reproduction target, the influence on Z in the color matching function is large, because the fluorescent whitening agent has an influence on the short wavelength side. The influence on b* in L*a*b* is large. For this reason, in the illustrated observation white point chart CC, the range developed in the b* direction is wider than the range developed in the a* direction. In the example shown in the figure, a total of 45 patches are prepared, that is, five levels 1 to 5 in the a* direction and nine levels 1 to 9 in the b* direction. As shown in the enlarged view of one patch SCC constituting the observation white point chart CC, patch numbers 1 to 45, values of Lab (for example, L1, a1, and b1), and values of XYZ (for example, X1, Y1, and Z1) are described in each patch as information relating to the patch. It is not necessary to describe all of these, and it is sufficient to describe what enables input of patch information (to be described later).

The observation white point chart CC represented by the Lab color values is converted to CMYK data using the medium profile for the printer 45 that prints on the indication print medium (step S330). The conversion is an absolute rendering intent that preserves absolute color values. The conversion performed in step S400 of FIG. 2 uses an absolute rendering intent. Absolute rendering intent is used because the observation white point chart CC is a chart for searching for a patch having a color close to the white color of the reproduction print medium when the observation white point chart CC is processed by the same absolute rendering intent. Then, the image data of the observation white point chart CC that was color-converted into CMYK is subjected to a color separation process (step S340) and is printed on the medium MD, which is an indication print medium (step S350). As a result, the observation white point chart CC illustrated in FIG. 5 is printed.

Figure 2:
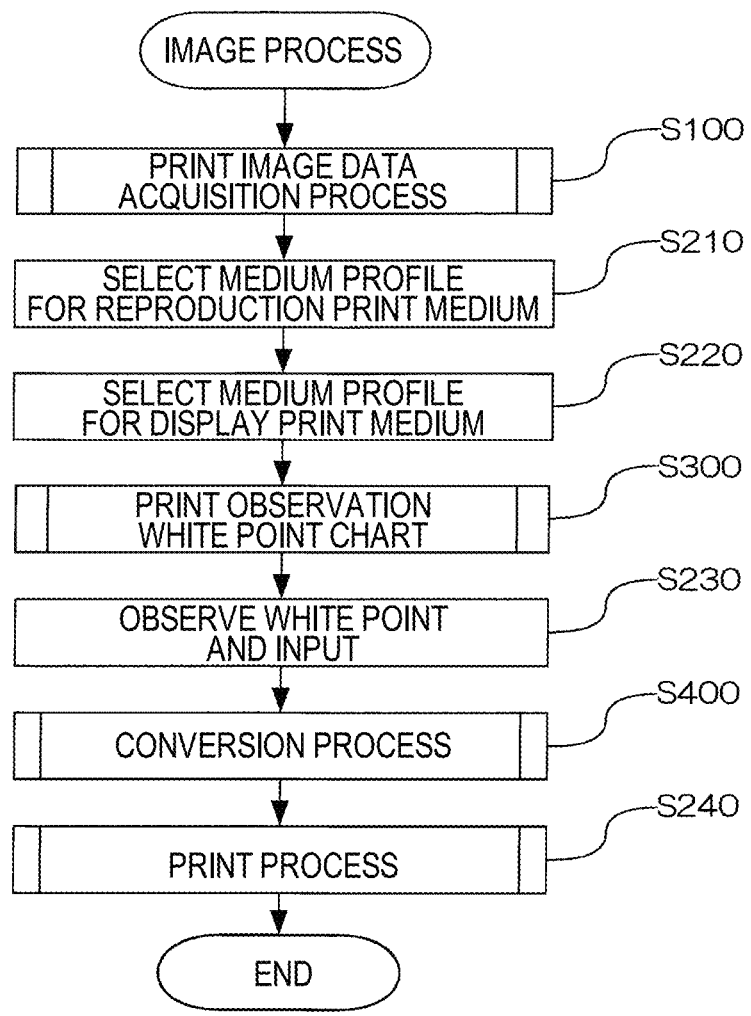
FIG. 2 is a flowchart illustrating an image processing routine according to the embodiment.
Figure 6A:
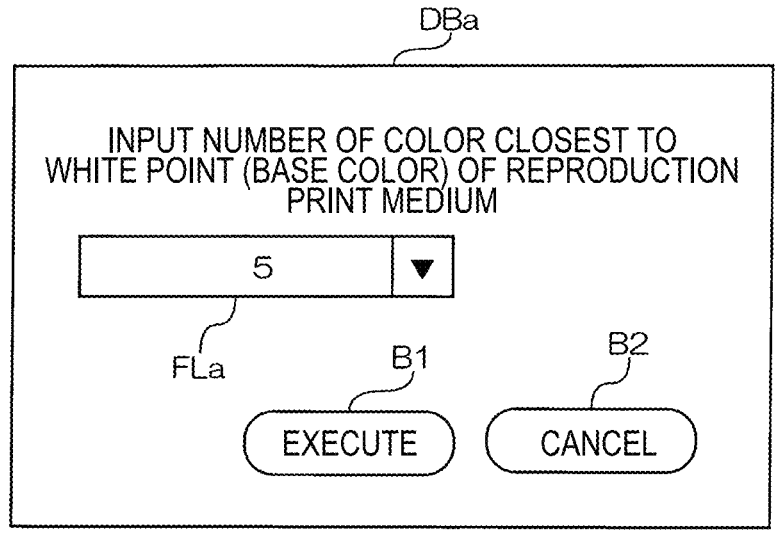
FIG. 6A is an explanatory diagram showing an example of a dialog box for inputting the number of the closest base color (white point).
Figure 6B:
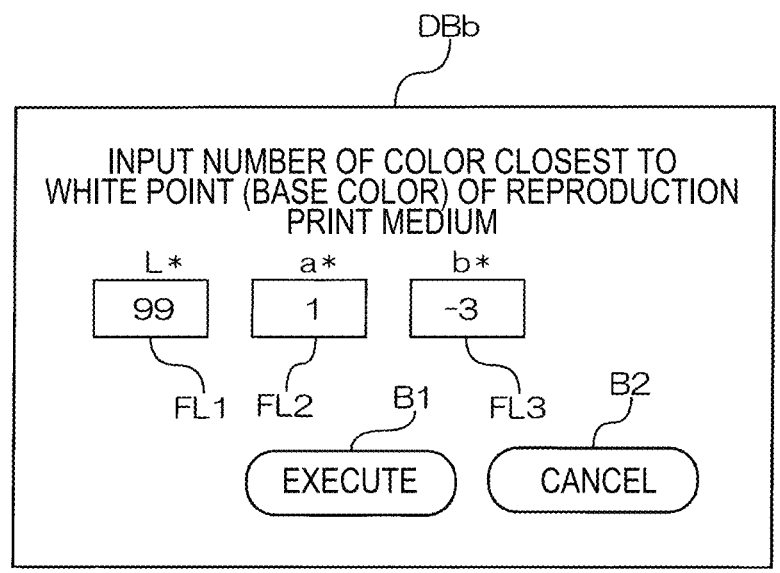
FIG. 6B is an explanatory diagram showing an example of a dialog box for inputting color values of the closest base color (white point).
Figure 6C:
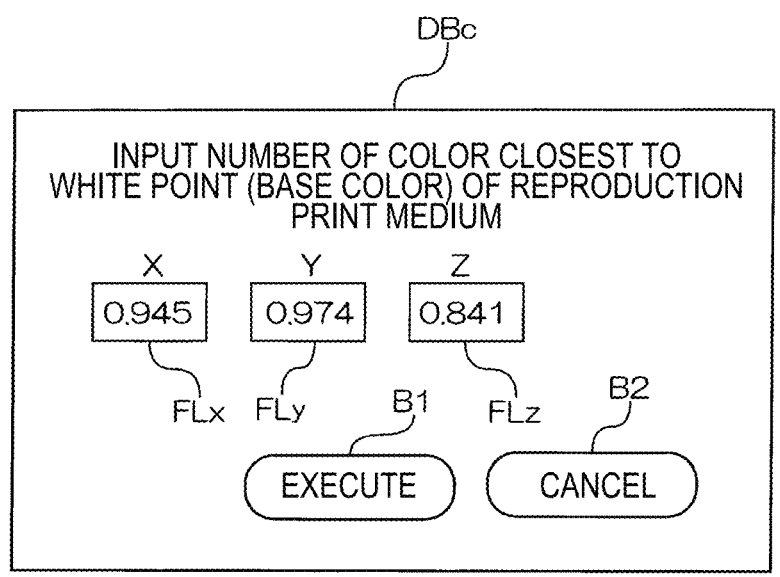
FIG. 6C is an explanatory diagram showing an example of a dialog box for inputting color values of the closest base color (white point).

Each patch of the observation white point chart CC thus printed is compared with the white color (base color) of the reproduction print medium in the observation environment, and an input process for the patch information of the corresponding white point is performed (FIG. 2, step S230). The observation white point chart CC is observed under an arbitrary observation environment, and patch information in the chart that appears closest to the white color of the reproduction print medium PP is input. The patch information may be input using any of the patch numbers 1 to 45 assigned to the patches, the values of Lab, or the values of XYZ. Dialog boxes DBa to DBc for inputting patch information are schematically shown in FIGS. 6A to 6C. Such a dialog box is displayed on the image display section 60.

FIG. 6A illustrates a dialog box DBa for entering patch information by patch number. As shown in the drawing, an input field FLa in which a patch number can be selected is displayed in the dialog box DBa, and a downward triangle at the right end of the input field FLa is clicked using a pointing device (not shown), whereby patch numbers 1 to 45 are displayed as a pop-up menu, and a desired patch number is selected. When the execution button B1 is clicked after the selection, the patch number is input to the image processing section 20 via the input section 23. A cancel button B2 is also displayed in the dialog box DBa, and when this button is clicked, input of patch information can be interrupted.

The patch information may be input as numerical values of L*a*b* or numerical values of XYZ instead of by patch number. FIG. 6B shows an example of a dialog box DBb for inputting patch information by numerical values of L*a*b*, and FIG. 6C shows an example of a dialog box DBc for inputting patch information by numerical values of XYZ. Since each color system is represented as a combination of three numerical values, the input fields FL1, FL2, and FL3 for inputting the respective numerical values of L*a*b* are provided in the dialog box DBb and the input fields FLx, FLy, and FLz for inputting the respective numerical values of XYZ are provided in the dialog box DBc. These dialog boxes DBb and DBc are also provided with an execution button B1 and a cancel button B2.

L*a*b* and XYZ may be input by selecting each field and directly inputting numeric values using a keyboard (not shown) or may be selected by displaying values corresponding to the patches as a pop-up menu and selecting using a pointing device such as a mouse (not shown).

Figure 7:
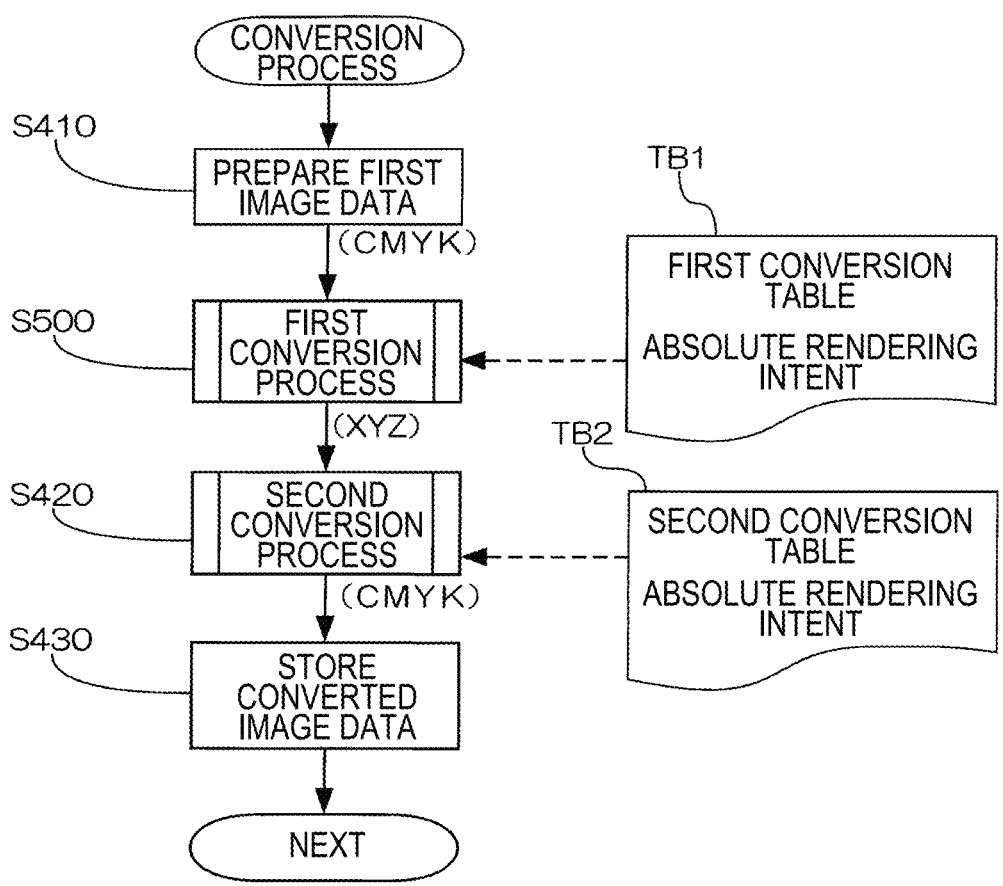
FIG. 7 is a flowchart illustrating an overview of white point conversion process.

When the user observes the color of each patch of the white point chart CC and the white color (base color) of the print medium PP to be printed on by the printing device 55 and inputs the patch information of the patch of the color closest to the white color (base color) of the print medium PP (FIG. 2, step S230), the conversion process (step S400) is performed. An example of this conversion process is shown in FIG. 7. The conversion process is a process of converting the first image data taking into consideration the color of the white color (base color) of the print medium PP so that when the image corresponding to the first image data is printed on the medium MD by the printer 45, the image on the medium MD will have a color close to the color of the image when printed on the print medium PP by the printing device 55.

Figure 8:
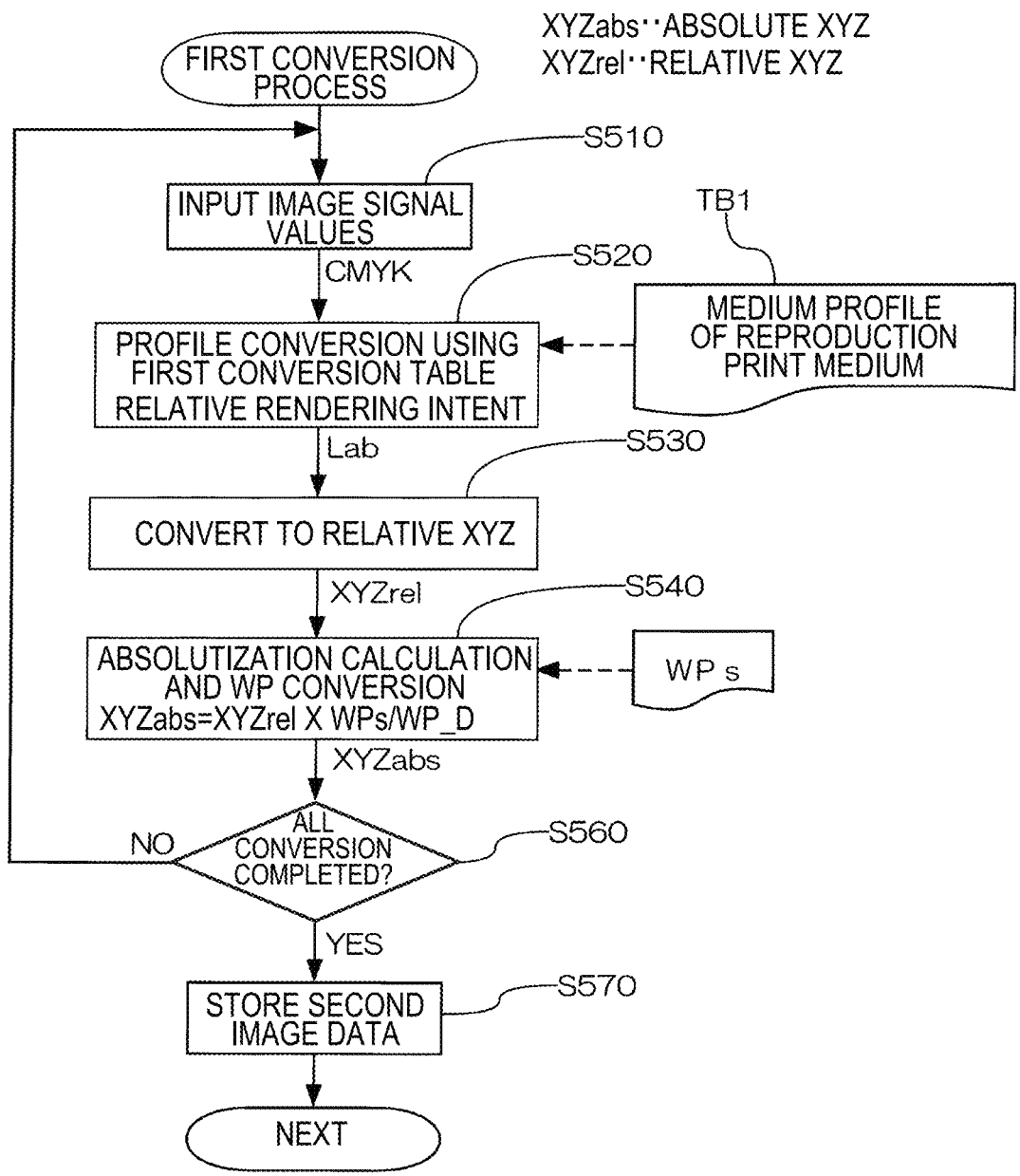
FIG. 8 is a flowchart illustrating an example of a first conversion process.

When the conversion process is started, the first image data is prepared (step S410). As shown in FIGS. 3A and 3B, the first image data is of the CMYK color system in the present embodiment. Next, the first conversion is executed (step S500). An example of the first conversion is shown in FIG. 8. In the first conversion process illustrated in FIG. 8, white point conversion using an observation white point is performed on the first image data, and the first image data is converted into second image data. This process performed by the conversion section 24 corresponds to a first conversion section. In the first conversion process, first the image signal values of the first image data are input (step S510), and are subjected to profile conversion using the medium profile of the reproduction print medium (step S520). Here, the medium profile of the reproduction print medium is converted as a first conversion table TB1 for conversion from CMYK values to Lab values. This conversion is performed using relative rendering intent. As a result, the image signal values CMYK of the first image data become the relative color values Lab. Further, this signal is converted into the XYZ color system (step S530). The conversion results are hereinafter referred to as relative XYZs, and are denoted by XYZrel, including in the drawing of FIG. 8 and in subsequent drawings. Absolute XYZs are expressed as XYZabs in order to distinguish them from XYZrel. The XYZ color system corresponds to a profile connection space.

Next, using the patch information WPs of the patch corresponding to the white point (base color) observed and selected using the observation white point CC, the color values represented by the relative XYZ-system are absolutized, and at the same time, the white point conversion is calculated (step S540). This calculation is performed by the following matrix calculation equation (1).

$$[Xs, Ys, Zs]abs = [Xt, Yt, Zt]rel \times [WPs]/[WP\_D50] \quad (1)$$

Here, [Xt, Yt, Zt] indicates the color values XYZ on the reproduction print medium, and [Xs, Ys, Zs] indicates the color values XYZ to be reproduced on the expression print medium. Hereinafter, the subscript notation of "t" and "s" will be omitted when explicit. WP D50 is the XYZ of a D50 light source. Specifically:

$$[X, Y, Z] = [0.9642, 1, 0.82491]$$

The calculation equation shown in equation (1) corresponds to sequential execution of processes according to the following equation (1a) for converting relative XYZ representing color values on the reproduction print medium into absolute XYZ, and processes according to the following equation (1b) for converting absolute XYZ representing color values on the reproduction print medium into absolute XYZ in the profile connection space. It should be noted that WPt is the medium white point of the medium profile of the reproduction print medium.

$$[Xt, Yt, Zt]abs = [Xt, Yt, Zt]rel \times [WPt]/[WP\_D50] \quad (1a)$$

$$[Xs, Ys, Zs]abs = [Xt, Yt, Zt]abs \times [WPs]/[WPt] \quad (1b)$$

The above equation (1) is obtained by substituting equation (1a) for the right part of equation (1b). This is equivalent to converting the relative XYZ of the color values of each pixel on the reproduction print medium to absolute XYZ, and at the same time performing white point conversion. The conversions may be performed all at once, as shown in equation (1), or sequentially, as shown in equations (1a) and (1b). Of course, if the result is the same, it may be performed in accordance with another conversion formula.

By performing the process described above, the relative XYZ of the color values of each pixel on the reproduction print medium is converted into the absolute XYZ in the profile connection space of the color value to be reproduced on the expression print medium, with the color that was selected as being close to the paper white of the print medium PP as white. That is, by the above-described process, the color values of the image signal of the first image data are converted from the relative color values based on the paper white of the reproduction print medium under the D50 light source, which is the reference light source of the profile, to the absolute color values including the color of the paper white and become second image data of the absolute XYZ, which are the color values to be reproduced on the expression print medium, via white point conversion using the paper white appearance WPs under the observation environment. Until the processes for all the image signal values of the first image data are completed (step S560: "NO"), the above-described processes (steps S510 to S540) are repeated, and when all the conversions are completed (step S560: "YES"), the second image data obtained as a result of the conversion process is stored in the storage section 30 (step S570), and the first conversion process is ended.

After the first conversion process, the second conversion process (FIG. 7, step S420) is performed. This process performed by the conversion section 24 corresponds to a second conversion section. In the second conversion process, the second image data that was stored in the storage section 30 in the first conversion process is converted into the CMYK color system using a second conversion table TB2, which is a medium profile for when an image is to be formed on the medium MD, which is the indication print medium, in the printer 45. This conversion is performed by absolute rendering intent. The print image data converted in the second conversion process is stored in the storage section 30 (step S430).

After the conversion process (FIG. 2, step S400) is performed, an image is printed on the medium MD by the printer 45 using the converted print image data stored in the storage section 30 (step S240). In this way, the color appearance of the print image formed on the print medium PP in the printing device 55 is reproduced on the medium MD.

By this image process, even when the print medium PP on which an image is to be formed by the printing device 55 is a cloth or a medium coated with a fluorescent bleaching agent, because the observation white point with the color nearest to the white point (base color) of the original print medium PP is selected from the observation white points printed on the observation chart CC and input and the conversion process is performed, the color of the image formed on the print medium PP by the printing device 55 can be reproduced by the image formed on the medium MD by the printer 45, and the color formed on the print medium PP by the printing device 55 can be easily confirmed. In addition, even when the observation environment is changed due to a different light source or the like, or the type or shading of the fluorescent whitening agent is different, or the base color of the print medium itself is different, it is sufficient to form the observation white point chart CC including the white point of the medium profile on the medium MD using the printer 45 and to input the patch information of the corresponding patch, and it is not necessary to perform troublesome operation management such as re-creating the profile to reproduce the color.

The configuration and the image processing of the image processing device 100 have been described above and the printing system 300, which includes the image processing device 100, may actually print the image on the print medium PP using the printing device 55 once the color of the image to be formed on the print medium PP by the printing device 55 is confirmed using the image formed on the medium MD by the printer 45 using the above-described method. By this, the printing system 300 enables checking the color of the image to be formed on the print medium PP before actual printing. Therefore, it is possible to create or modify the original image data PID until the image to be formed on the print medium PP has a desired color, without actually forming an image on the print medium PP. Therefore, it is not necessary to perform test printing on the print medium PP many times before forming an image on the print medium PP, and it is possible to reduce time and effort for printing and waste of the print medium PP.

B. Second Embodiment

Figure 9:
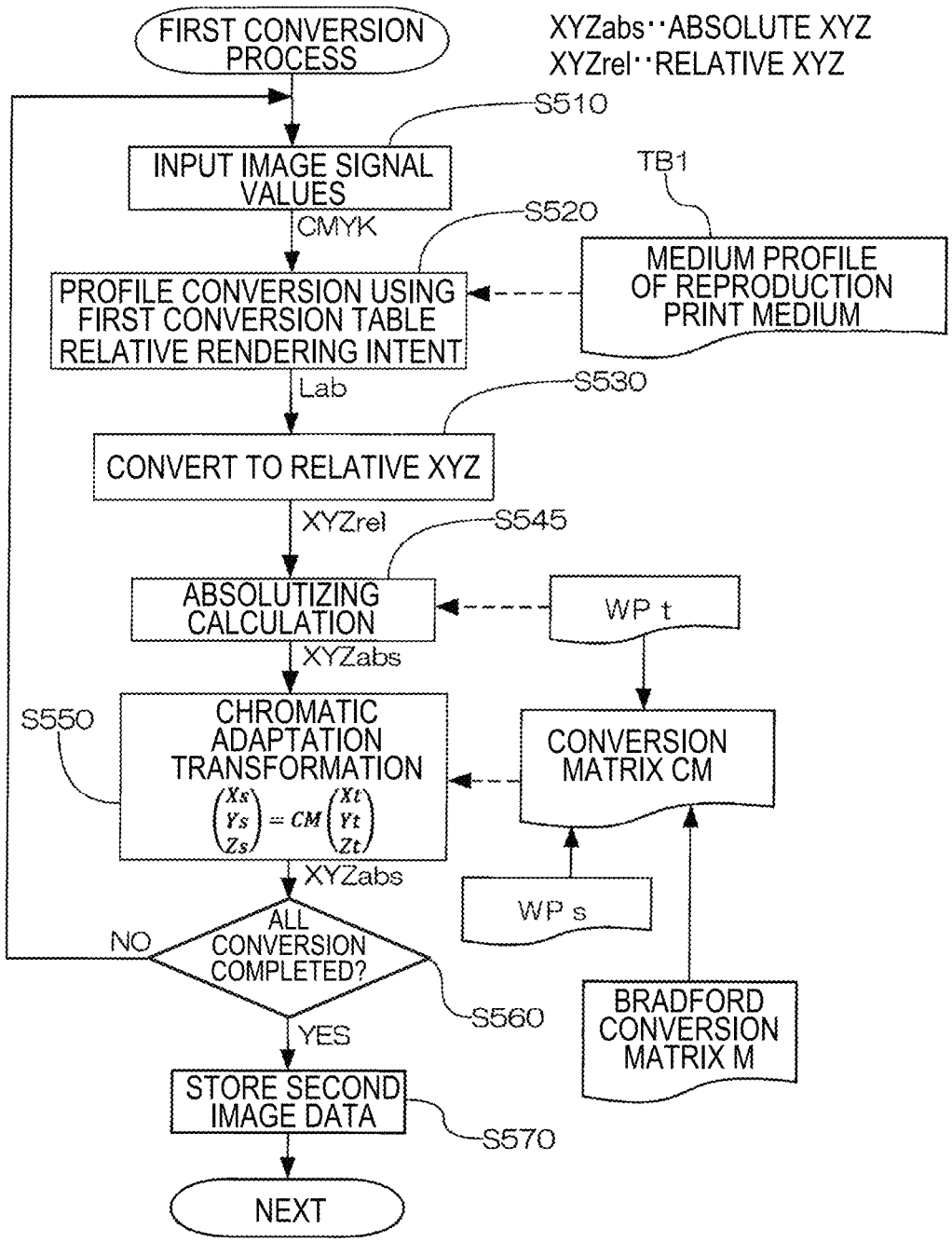
FIG. 9 is a flowchart showing the contents of a first conversion process according to a second embodiment.

Another example of the first conversion process will be described. The hardware configurations of the image processing device 100 and the printing system 300 according to the second embodiment are the same as those of the first embodiment, and only the contents of the first conversion process are different. The first conversion process of the second embodiment is shown in FIG. 9. As shown in the figure, in the second embodiment, input of image signal values (step S510), profile conversion by the first conversion table (step S520), and conversion from Lab color values to relative XYZ-color values (step S530) are performed similarly to the first conversion process of the first embodiment. Thereafter, in the second embodiment, an absolutizing calculation for absolutizing the relative XYZ-color values is performed (step S545).

In the second embodiment, at the time of the absolutizing calculation, the color values WPt of the white point defined in the medium profile of the reproduction print medium is used, and not the color value WPs of the white point selected on the observation white point chart CC. Therefore, the absolutizing calculation is performed by the following determinant (2).

$$[Xt,Yt,Zt]abs=[Xt,Yt,Zt]rel \times [WPt]/[WP\_D50] \qquad (2)$$

This equation is the same as the equation (1a) described in the first embodiment.

The color values (Xt, Yt, Zt) are then transformed using a chromatic adaptation transformation (step S550). Here, the conversion is performed by the following equation (3) using a 3×3 conversion matrix CM calculated from the known Bradford's conversion matrix M, the color values WPt of the white point defined in the medium profile of the reproduction print medium, and the color values WPs of the white point selected on the observation white point chart CC.

$$[Xs,Ys,Zs]abs=[CM][Xt,Yt,Zt]abs \qquad (3)$$

By the above-described process, the image signal of the first image data represents, by the absolute XYZ, the color corresponding to the appearance based on the patch information WPs of the patch selected by the user from the observation white point chart CC. Until the processes for all the image signal values of the first image data are completed (step S560: "NO"), the above-described processes (steps S510 to S550) are repeated, and when all the conversions are completed (step S560: "YES"), the second image data obtained as a result of the conversion process is stored in the storage section 30 (step S570), and the first conversion process is ended. It should be noted that the above-described processes are not necessarily performed one by one, and two or more steps may be combined to derive a conversion formula, and the processes may be performed collectively. Alternatively, it may be further subdivided and performed.

According to the image processing device 100 and the printing system 300 of the second embodiment described above, in addition to the same effects as those of the first embodiment, since the chromatic adaptation transformation simulating the characteristics of the human photoreceptor cells (cones), specifically, the Bradford conversion matrix, is used for the conversion using a white point, the color on the reproduction print medium PP can be reproduced on the medium MD even more faithfully.

Figure 10:
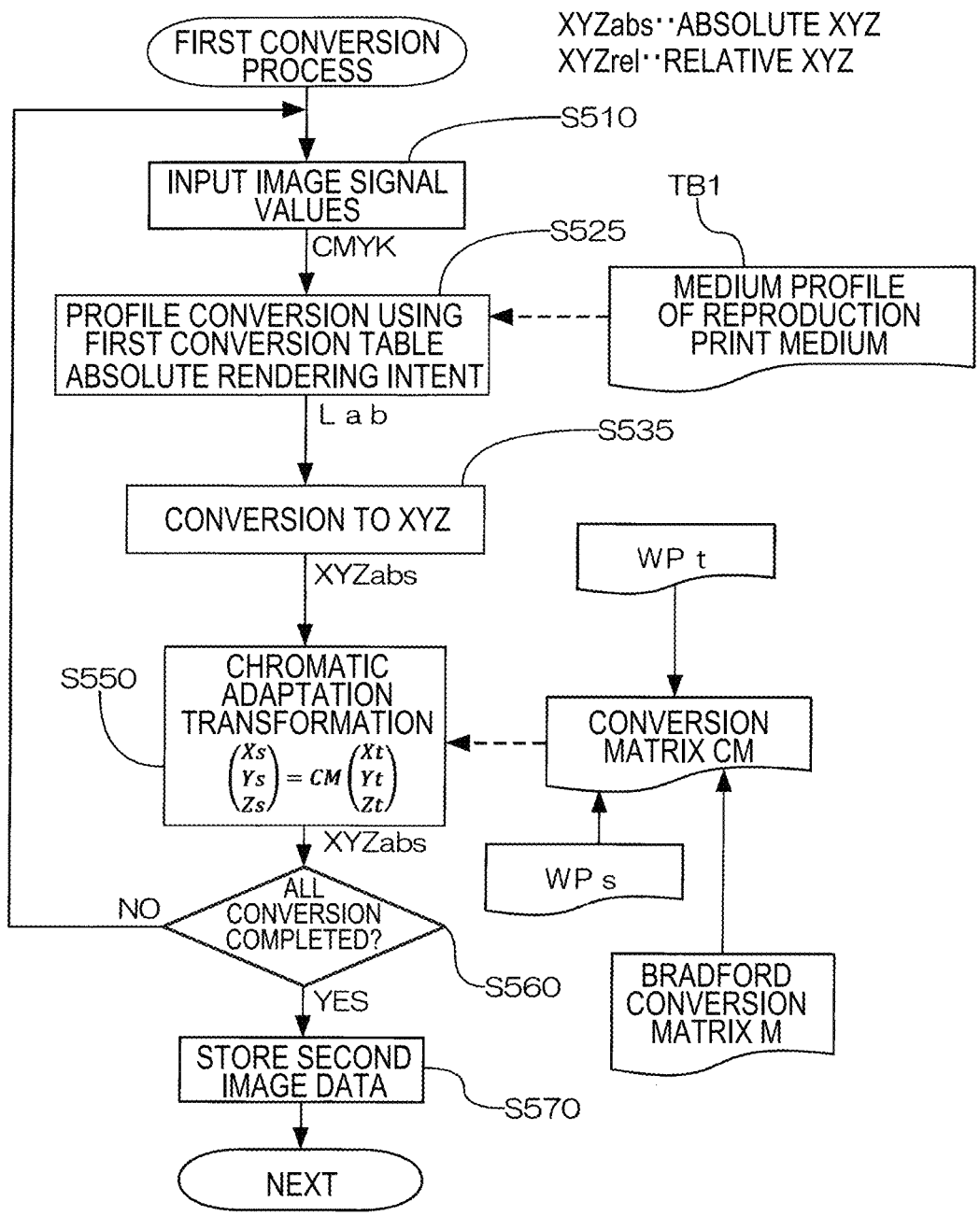
FIG. 10 is a flowchart illustrating another example of the first conversion process.

FIG. 10 shows another conversion example using chromatic adaptation transformation. In step S520 of the first and second embodiments, the profile conversion by the first conversion table is performed by the relative rendering intent. However, in the illustrated conversion process, the conversion is performed by absolute rendering intent by using a profile holding an absolute rendering intent tag (step S525). A profile holding such an absolute rendering intent tag (A2B3 tag) is standardized by, for example, ICC ver5, and can be easily implemented by using a profile having a conversion table directly corresponding to the absolute rendering intent. In this case, it is only necessary to perform conversion to absolute XYZs (step S535) instead of conversion to relative XYZs (step S530) in the second embodiment, and the absolutizing calculation (step S545) is not necessary. The process after the chromatic adaptation transformation in step S550 is the same as that in the second embodiment. According to such a conversion process, the same operation and effect as those of the second embodiment described above are achieved.

C. Other Embodiments (1) The present disclosure can also be implemented in the following forms. Another embodiment is a mode as an image processing device. The image processing device includes an image data acquisition section configured to acquire a print image as first image data represented in a first color space used for forming an image on a first print medium; an input section configured to input information on appearance, in a predetermined observation environment, of a base color section where an image is not formed on the first print medium; a first conversion section configured to acquire second image data by performing, on the first image data, conversion into a representation in a profile connection space using a first conversion table and white point conversion using the information on appearance; a second conversion section configured to use a second conversion table to convert the second image data into converted image data that is represented in a second color space used for forming an image on a second print medium; and an image forming section configured to use the converted image data to form an image corresponding to the print image on the second print medium.

By this, it is possible to easily confirm the appearance of the image formed on the first print medium on which the image is printed, in particular, the appearance of the color, using the image formed on the second print medium. In addition, even in a case where the first print medium itself has a color close to white or the first print medium is provided with a fluorescent whitening agent, it is easy to check the appearance of the first print medium using the image on the second print medium. Therefore, in an arbitrary observation environment in which the condition is different from the illumination at the time of measuring the color of the original image to be printed, the color matching in the vicinity of white in which the color deviation is likely to occur is facilitated. It is not necessary to individually recreate the first conversion table and the second conversion table according to differences in the observation environment. Therefore, it is possible to reduce time and effort when checking the appearance of the image formed on the first print medium using the image formed on the second print medium.

The image data acquisition section acquires the print image as the first image data represented in the first color space used for forming an image on the first print medium, and it is sufficient that it acquire the first image data by performing color conversion into the first image data represented in the first color space in accordance with the format of the original print image. If the print image is represented in the first color space in advance, it is sufficient that the print image be acquired as the first image data without conversion. It is sufficient that the profile be applied in accordance with the format of the print image and, as illustrated in FIG. 3B, that the print image be converted into a format represented by the first color space used for forming an image on the first print medium. The profile connection space is for connecting the first color space to the second color space, and XYZ, L*a*b*, or the like, which are device-independent color systems, are usually used, but another color system may be used.

As the observation environment, the appearance is affected by what kind of light source is used for observation. Not only a difference in white point between light sources but also a difference in luminance or the like between the light sources has an influence on the appearance. Since values in the XYZ color system are uniquely determined for a color whose white point or the like is determined, such as D50 or D65, the color can be converted using the values.

(2) In the configuration of (1) described above, the first conversion section may perform the white point conversion by performing multiplication using color values of the base color section included in the information on appearance. By this, as shown in the determinant (1), white point conversion can be performed by a simple calculation. Note that white point conversion may be performed by multiplying the color values of the base color section included in the information on appearance by the reciprocal of the color value of the white point in the first conversion table. Multiplication of the reciprocal of the color values of the white point in the first conversion table is equivalent to division by the color values of the white point in the first conversion table.

(3) In the configuration of (1), the first conversion section may perform the white point conversion using chromatic adaptation transformation. By this, it is possible to perform chromatic adaptation transformation, which is close to the human visual characteristics, and it is possible to even more accurately check the appearance of the color of the image to be formed on the first print medium by using the image formed on the second print medium.

(4) In the configurations of (1) to (3), the image processing apparatus may further include a chart generation section configured to acquire a white point in the first conversion table and generate, in the profile connection space, a white point vicinity chart including the white point, wherein the input section inputs the information on appearance using color values acquirable from the chart by a comparison of the base color section with the chart. By this, it is possible to use the chart to facilitate input of information on appearance, in a predetermined observation environment, of a base color section where an image is not formed on the first print medium. Since the chart can be used without depending on the observation environment, once such a chart is created, it is not necessary to print out each time for each print image.

(5) In the above configurations (1) to (4), the chart generation section may convert the chart into a representation in the second color space using the second conversion table by an absolute rendering intent and provides the converted chart for the comparison with the base color section of the first print medium by printing the converted chart on the second print medium. By this, it is easy to input the information on appearance.

(6) In the above-described configurations (1) to (5), the information on appearance may be input by specifying color values in the profile connection space or, from among a plurality of patches constituting the created chart, one patch that is associated with the color values in the profile connection space. By this, it is possible to easily and accurately input the information of the appearance.

(7) In the above configurations (1) to (6), when the profile connection space is the L*a*b* color system, a range of the chart may include color values of the white point and span across a first range that is a predetermined range in a* and a second range that is a range wider than the first range in b*. By this, it is possible to easily cope with a case where the first print medium contains a fluorescent whitening agent and is greatly influenced on the short wavelength side. When converting to L*a*b*, the b* side is broadened, but in the case of color matching, the Z side is broadened.

(8) In the configuration of (6) described above, the image forming section may be either [1] a printer that forms an image on a print sheet, which is the second print medium, using ink or [2] a display device configured to optically form an image on a display, which is the second print medium. By this, with respect to [1], the second print medium on which the image corresponding to the print image is formed is different from the first print medium, but is also a print medium. Therefore, the user can easily grasp the appearance of the image printed on the first print medium. With respect to [2], although the second print medium is a display, the user can grasp the appearance of the image printed on the first print medium because color conversion is performed and the image is displayed in a color development close to an equivalent color, and resource saving can be achieved because consumable material such as ink is not used for forming the image. Also, a display can generally be made smaller than a printer or the like. When a tablet or the like is used as the optical display device, a highly versatile configuration can be realized. Regardless of which method, when an image corresponding to the print image is formed on the second print medium, the second print medium may be subjected to physical base rendering, and the image may be displayed thereon.

(9) Another embodiment of the present disclosure is an aspect as an image processing program. This image processing program is realized by a computer executing a first function of acquiring a print image as first image data represented in a first color space used for forming an image on a first print medium; a second function of inputting information on appearance, in a predetermined observation environment, of a base color section where an image is not formed on the first print medium; a third function of acquiring second image data by performing, on the first image data, conversion into a representation in a profile connection space using a first conversion table and white point conversion using the information on appearance; a fourth function of using a second conversion table to convert the second image data into converted image data that is represented in a second color space used for forming an image on a second print medium; and a fifth function of forming an image corresponding to the print image on the second print medium using the converted image data. According to the image processing program, it is possible to easily confirm the appearance of the image to be formed on the first print medium on which the image is to be printed, in particular, the appearance of the color, using the image formed on the second print medium. In addition, even in a case where the first print medium itself has a color close to white or the first print medium is provided with a fluorescent whitening agent, it is easy to check the appearance of the first print medium using the image on the second print medium. Therefore, in an arbitrary observation environment in which the condition is different from the illumination at the time of measuring the color of the original image to be printed, the color matching in the vicinity of white in which the color deviation is likely to occur is facilitated. It is not necessary to individually recreate the first conversion table or the second conversion table according to differences in the first print medium or differences in the observation environment. Therefore, it is possible to reduce time and effort when checking the appearance of the image formed on the first print medium using the image formed on the second print medium.

(10) In each of the above-described embodiments, a part of the configuration realized by hardware may be replaced with software. At least a part of the configuration realized by software can also be realized by a discrete circuit configuration. In a case where some or all of the functions of the present disclosure are realized by software, the software (computer program) can be provided in a form stored in a computer-readable storage medium. The "computer-readable storage medium" is not limited to a portable storage medium such as a flexible disk or a CD-ROM, and also includes an internal storage device in a computer such as various RAMs or ROMs, or an external storage device fixed to a computer such as a hard disk. That is, the "computer-readable storage medium" has a broad meaning including an arbitrary storage medium capable of fixing a data packet in a non-transitory manner.

The present disclosure is not limited to the above described embodiments, and can be realized by various configurations without departing from the scope of the present disclosure. For example, the technical features in the embodiments corresponding to the technical features in the aspects described in the summary of disclosure can be replaced or combined as appropriate in order to solve some or all of the problems described above or in order to achieve some or all of the effects described above. If the technical features are not described as essential in this specification, the technical features can be appropriately deleted.

What is claimed is:
1. An image processing device comprising:
a processor
configured to acquire a print image as first image data represented in a first color space used for forming an image on a first print medium;
configured to input information on appearance, in a predetermined observation environment, of a base color area of the first print medium where an image is not formed on the first print medium;
configured to acquire second image data by performing, on the first image data, conversion into a representation in a profile connection space using a first conversion table and white point conversion using the information on appearance;
configured to use a second conversion table to convert the second image data into converted image data that is represented in a second color space used for forming an image on a second print medium; and configured to use the converted image data to form an image corresponding to the print image on the second print medium, the information on appearance being acquired by comparing a white point vicinity chart printed on the second print medium and a color of the base color area of the first print medium in the predetermined observation environment.

2. The image processing device according to claim 1, wherein the processor performs the white point conversion by performing multiplication using color values of the base color area of the first print medium included in the information on appearance.

3. The image processing device according to claim 1, wherein the processor performs the white point conversion using chromatic adaptation transformation.

4. The image processing device according to claim 1, wherein the processor is further configured to acquire a white point in the first conversion table and generate, in the profile connection space, the white point vicinity chart including the white point, and configured to input the information on appearance using color values acquirable from the white point vicinity chart by a comparison of the base color area of the first print medium with the white point vicinity chart printed on the second print medium.

5. The image processing device according to claim 4, wherein the processor is further configured to convert the white point vicinity chart into a representation in the second color space using the second conversion table by an absolute rendering intent and provides the converted chart for the comparison with the base color area of the first print medium by printing the converted chart on the second print medium.

6. The image processing device according to claim 5, wherein the information on appearance is input by specifying color values in the profile connection space or, from among a plurality of patches constituting the white point vicinity chart printed on the second print medium, one patch that is associated with the color values in the profile connection space.

7. The image processing device according to claim 4, wherein when the profile connection space is the L*a*b* color system, a range of the white point vicinity chart includes color values of the white point and spans across a first range that is a predetermined range in a* and a second range that is a range wider than the first range in b*.

8. The image processing device according to claim 1, further comprising

[1] a printer that forms an image on a print sheet, which is the second print medium, using ink, or

[2] a display device configured to optically form an image on a display.

9. A non-transitory computer-readable storage medium storing an image processing program, the image processing program comprising:

a first function of acquiring a print image as first image data represented in a first color space used for forming an image on a first print medium;

a second function of inputting information on appearance, in a predetermined observation environment, of a base color area of the first print medium where an image is not formed on the first print medium;

a third function of acquiring second image data by performing, on the first image data, conversion into a representation in a profile connection space using a first conversion table and white point conversion using the information on appearance;

a fourth function of using a second conversion table to convert the second image data into converted image data that is represented in a second color space used for forming an image on a second print medium; and a fifth function of forming an image corresponding to the print image on the second print medium using the converted image data, the information on appearance being acquired by comparing a white point vicinity chart printed on the second print medium and a color of the base color area of the first print medium in the predetermined observation environment.

* * * * *